United States Patent
Lee et al.

(10) Patent No.: US 7,876,979 B2
(45) Date of Patent: Jan. 25, 2011

(54) RESOLUTION-CONVERTING APPARATUS AND METHOD

(75) Inventors: Ho-young Lee, Suwon-si (KR);
Chang-yeong Kim, Yongin-si (KR);
Du-sik Park, Suwon-si (KR);
Seong-deok Lee, Suwon-si (KR);
Alexey Lukin, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 1566 days.

(21) Appl. No.: 11/202,030

(22) Filed: Aug. 12, 2005

(65) Prior Publication Data
US 2006/0033936 A1 Feb. 16, 2006

(30) Foreign Application Priority Data
Aug. 12, 2004 (KR) ............ 10-2004-0063605

(51) Int. Cl.
*G06K 9/32* (2006.01)
*G06K 9/48* (2006.01)

(52) U.S. Cl. ............ 382/300; 382/298; 382/299; 382/199

(58) Field of Classification Search ......... 382/298, 382/299, 300, 199
See application file for complete search history.

(56) References Cited

U.S. PATENT DOCUMENTS

| | | | |
|---|---|---|---|
| 5,008,752 A * | 4/1991 | Van Nostrand | 348/581 |
| 5,446,804 A * | 8/1995 | Allebach et al. | 382/298 |
| 5,552,825 A * | 9/1996 | Talluri et al. | 348/222.1 |
| 5,671,298 A | 9/1997 | Markandey et al. | |
| 5,852,470 A | 12/1998 | Kondo et al. | |
| 5,880,767 A * | 3/1999 | Liu | 347/251 |
| 5,889,895 A | 3/1999 | Wong et al. | |
| 6,587,602 B2 | 7/2003 | Wakisawa et al. | |
| 6,714,688 B1 * | 3/2004 | Gallagher et al. | 382/266 |
| 7,123,781 B2 * | 10/2006 | Maenaka et al. | 382/300 |
| 7,126,643 B2 * | 10/2006 | Song et al. | 348/448 |
| 7,286,721 B2 * | 10/2007 | Huang et al. | 382/299 |
| 7,423,691 B2 * | 9/2008 | Orlick et al. | 348/448 |
| 7,605,848 B2 * | 10/2009 | Lee et al. | 348/223.1 |

(Continued)

FOREIGN PATENT DOCUMENTS

JP      07-255034      10/1995

(Continued)

OTHER PUBLICATIONS

Wang, Q. and Ward, R. "A New-Edge Directed Image Expansion Scheme" 2001, IEEE, pp. 899-902.*

(Continued)

*Primary Examiner*—Bhavesh M Mehta
*Assistant Examiner*—Utpal Shah
(74) *Attorney, Agent, or Firm*—Staas & Halsey LLP

(57) ABSTRACT

The resolution-converting method comprises steps of applying an edge-directed interpolation to an input image and producing an intermediate image; converting a sampling rate with respect to the intermediate image and producing an output image having a predetermined resolution; and improving sharpness of the produced output image. The present invention prevents image-quality degradation factors that can occur in the conventional resolution-converting method as well as obtains an output image having a resolution of a desired size.

24 Claims, 21 Drawing Sheets

U.S. PATENT DOCUMENTS

| | | | |
|---|---|---|---|
| 7,609,912 B2* | 10/2009 | Chae | 382/300 |
| 2002/0140854 A1* | 10/2002 | Lan | 348/448 |
| 2004/0076343 A1* | 4/2004 | Zhang et al. | 382/300 |
| 2005/0058371 A1* | 3/2005 | Huang et al. | 382/300 |
| 2005/0094899 A1* | 5/2005 | Kim et al. | 382/300 |
| 2005/0270419 A1* | 12/2005 | De Haan | 348/458 |

FOREIGN PATENT DOCUMENTS

| | | |
|---|---|---|
| JP | 2000-69279 | 3/2000 |
| JP | 2000-270208 | 9/2000 |
| JP | 2000-299780 | 10/2000 |
| JP | 2001-136494 | 5/2001 |
| JP | 2001-238073 | 8/2001 |
| JP | 2001-268378 | 9/2001 |
| JP | 2002-152505 | 5/2002 |
| JP | 2002-215130 | 7/2002 |
| JP | 2004-180171 | 8/2004 |
| WO | WO 03/038753 | 5/2003 |

OTHER PUBLICATIONS

Allebach, J. and Wong, P. "Edge-Directed Interpolation", 1996, IEEE, vol. 3 pp. 707-710.*
Li, X. and Orchard, M. "New Edge-Directed Interpolation", 2001, IEEE Transactions on Image Processing, vol. 10 No. 10 pp. 1521-1527.*
Korean Office Action issued on Mar. 24, 2006 with respect to Korean Patent Application No. 2004-63605.
Chinese Patent Office Action, mailed May 25, 2007 and issued in corresponding Chinese Patent Application No. 20510903540.
Japanese Office Action dated, May 8, 2007, issued with respect to the corresponding Japanese Patent Application No. 2005-234907.
Japanese Patent Office Action, mailed Aug. 28, 2007 and issued in corresponding Japanese Patent Application No. 2005-234907.

* cited by examiner

DIRECTION 0 (-45°)

DIRECTION 1 (45°)

DIRECTION 2

DIRECTION 3

DIRECTION 4

DIRECTION 5

(i,j) (a)

(b) (i,j)

(c)

(d)

RESOLUTION-CONVERTING APPARATUS AND METHOD

CROSS-REFERENCE TO RELATED APPLICATION

This application claims benefit under 35 U.S.C. §119 from Korean Patent Application No. 2004-63605 filed on Aug. 12, 2004 in the Korean Intellectual Property Office, the entire content of which is incorporated herein by reference.

BACKGROUND OF THE INVENTION

1. Field of the Invention

The present invention generally relates to a resolution-converting apparatus and method. More particularly, the present invention relates to a resolution-converting apparatus and method preventing the occurrence of factors deteriorating image quality and converting an input image into an output image having a desired resolution size.

2. Description of the Related Art

The digital display devices, such as liquid crystal displays (LCDs) or the like, have a fixed screen resolution depending on products, unlike analog display devices, such as cathode ray tubes (CRTs), so resolution conversion is essential to convert the diverse resolutions of input images into a screen resolution of a display device. In particular, with the advent of high-definition televisions (HDTVs), the resolution conversion becomes more essential to display the images of existing standard definition-class resolution on a high-definition-class TV system.

However, the conventional methods used for such resolution conversions introduces image artifacts around image edges greatly affecting image perceptions through human eyes. There are the typical image artifacts such as the jagging artifacts of producing a sawtoothed pattern around image edges resulting from resolution conversions, the blurring artifacts of producing poor sharpness due to the resolution conversions, the ringing and aliasing artifacts around image edges due to poor filter characteristics, and so on. The conventional technologies related to the resolution conversions are mainly classified into a method using linear filtering technologies and a method using non-linear filtering technologies. That is, the method disclosed in U.S. Pat. Nos. 5,889,895 and 5,671,298 and U.S. Patent Application No. 2002/0140854 carry out resolution conversions using the linear filtering schemes, such as bilinear and cubic interpolations. However, such methods have a problem of deteriorating the image quality of output images since the sharpness becomes very poor due to the insufficient reproduction of the high-frequency components of an input image when upsizing resolutions. In order to compensate for such a problem, U.S. patent application No. 2002/0140854 discloses a method of outputting a high-definition image signal by identifying potential edge pixels with application of the peaking to a low resolution signal, applying the up-conversion with respect to the peaked image signal, and sequentially carrying out edge pixel detections, edge linking, and luminance transient improvements. However, the method enhances details and sharpness by using the existing linear filters during scaling and applying the peaking and luminance transient improvement functions based on the pre-processing and post-processing approaches before and after filtering, so the method needs lots of computations and a complicated hardware structure, therefore limiting the performance improvements.

The methods using the non-linear filtering techniques disclosed in U.S. Pat. Nos. 5,852,470 and 5,446,804 can be divided into the directional interpolation method and the content-based interpolation method. The directional interpolation method performs interpolation only in a direction parallel with an edge direction to prevent the edge components from producing blurring artifacts, using edge information of an image. The content-based interpolation method obtains an optimized scaling filter coefficient through a learning process in advance, selects a learned filter coefficient depending on local characteristics of an input image, and performs resolution conversions. Such methods provide relatively good results in the edge portions of an image, but has a disadvantage of degrading image quality in fine-textured regions.

SUMMARY OF THE INVENTION

Additional aspects and/or advantages of the invention will be set forth in part in the description which follows and, in part, will be apparent from the description, or may be learned by practice of the invention.

The present invention has been developed in order to solve the above drawbacks and other problems associated with the conventional arrangement. An aspect of the present invention is to provide a resolution-converting apparatus and method for converting an input image into an output image having a resolution of a desired size while eliminating the occurrence of image quality-degrading factors.

The foregoing and other objects and advantages are substantially realized by providing a resolution-converting method including applying an edge-directed interpolation to an input image and calculating an intermediate image; converting a sampling rate with respect to the intermediate image and calculating an output image having a predetermined resolution; and improving sharpness of the calculated output image.

According to an aspect of the present invention, the edge-directed interpolation operation includes operations of using absolute differences of pixels of the input image to estimate an edge direction; adaptively determining an interpolation coefficient based on a pixel value of a position corresponding to the estimated edge direction; using the edge direction and the interpolation coefficient and calculating the edge-directed interpolation value based on the edge direction and interpolation coefficient; and adaptively blending the edge-directed interpolation value and an interpolation value by a predetermined liner interpolation method and calculating a final interpolation value.

The edge direction is estimated with respect to two diagonal directions and four non-diagonal directions, and the predetermined linear interpolation method is a bi-cubic interpolation method.

According to an aspect of the present invention, the resolution-converting method further includes determining whether an interpolation region has a high spatial frequency, and, if the region has a high spatial frequency, using an interpolation value by the predetermined linear interpolation method to calculate a final interpolation value, and it is determined whether the region has the high spatial frequency by using mean-deviated local variance in the interpolation region.

The operation of calculating the output image includes multiplying a ratio of up-samplings and down-samplings calculated according to the resolution of the input image and a predetermined resolution and calculating the number of filter tabs; multiplying a window function by a sinc function and calculating a first-order filter coefficient by the number of filter tabs; using a value obtained from multiplying a Gaussian function and the window function in the first-order filter coefficient and calculating a final filter coefficient; and converting a sampling rate of the intermediate image, performing filtering in horizontal and vertical directions according to the final filter coefficient, and calculating an output image of a predetermined resolution.

The number of filter tabs is calculated based on an equation, that is, $$L=\text{round}(\text{Max}\{D,U\}\times\text{SmoothingAmount}\times n\text{Lobes}-1)\times 2-1$$

where L indicates a filter length, nLobes the number of side lobes, U and D ratios of optimized up-samplings to down-samplings, and SmoothingAmount a constant changing a cut-off frequency of the filter.

The first-order filter coefficient is calculated based on an equation. That is, $$h[i] = \left\{\frac{\sin(x)}{x}\right\} \times \text{kaiser}(1, \beta), \; i = 0, 1, \ldots, L-1,$$

$$x = \frac{i - \frac{L-1}{2}}{\frac{L-1}{2}} \times \pi \times \text{Lobes}$$

where $$\frac{\sin(x)}{x}$$

denotes an ideal low-frequency bandpass function and Kaiser $(1,\beta)$ is a Kaiser window function.

According to an aspect of the present invention, the improving the sharpness includes picking up two representative colors in an overlapped block of a predetermined size; increasing contrast between the picked-up representative colors; transiting a pixel value existing in an edge region to an approximate representative color of the two contrast-increased representative colors; and adding result values of the overlapped block by using a hanning window and calculating a final pixel value in order to remove block discontinuity.

The contrast of the representative colors is adaptively increased through a distance and a dot product between an input pixel and the two representative colors, and the two representative colors are picked up by the K-means algorithm.

According to an aspect of the present invention, a resolution-converting apparatus includes an edge-directed interpolation unit for applying an edge-directed interpolation to an input image and calculating an intermediate image; a linear filtering unit for converting a sampling rate with respect to the intermediate image and calculating an output image having a predetermined resolution; and a sharpness improvement unit for improving sharpness of the calculated output image.

According to an aspect of the present invention, the edge-directed interpolation unit uses absolute differences of pixels of the input image to estimate an edge direction, adaptively determines an interpolation coefficient based on a pixel value of a position corresponding to the estimated edge direction, uses the edge direction and the interpolation coefficient, calculates the edge-directed interpolation value, adaptively blends the edge-directed interpolation value and an interpolation value by a predetermined liner interpolation method, and calculates a final interpolation value.

The edge direction is estimated with respect to two diagonal directions and four non-diagonal directions, and the predetermined linear interpolation method is a bi-cubic interpolation method.

The edge-directed interpolation unit, if the region has a high spatial frequency, uses an interpolation value by the predetermined linear interpolation method to calculate a final interpolation value, and it is determined whether the region has the high spatial frequency by using mean-deviated local variance in the interpolation region.

According to an aspect of the present invention, the sharpness improvement unit picks up two representative colors in an overlapped block of a predetermined size, increases contrast between the picked-up representative colors, transits a pixel value existing in an edge region to an approximate representative color of the two contrast-increased representative colors, adds result values of the overlapped block by using a hanning window, and calculates a final pixel value in order to remove block discontinuity.

Preferably, the contrast of the representative colors is adaptively increased through a distance and a dot product between an input pixel and the two representative colors, and the two representative colors are picked up by the K-means algorithm.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
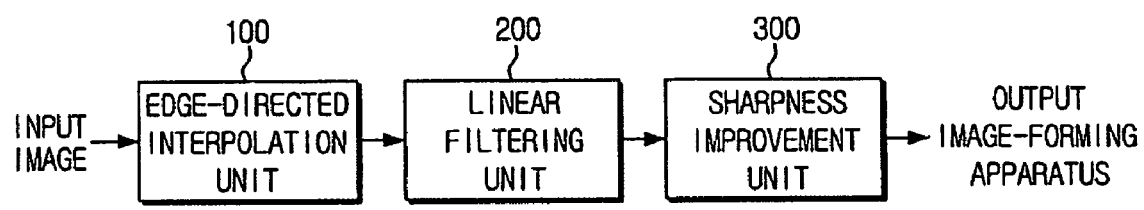
FIG. 1 is a block diagram of a resolution-converting apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, the present invention will be described in detail with reference to the accompanying drawings.

FIG. 1 is a block diagram of a resolution-converting apparatus according to an embodiment of the present invention. In FIG. 1, the resolution-converting apparatus includes an edge-directed interpolation unit 100, a linear-filtering unit 200, and a sharpness improvement unit 300. The edge-directed interpolation unit 100, the linear-filtering unit 200, and the sharpness improvement unit 300 are not software.

The edge-directed interpolation unit 100 applies the edge-directed interpolation to an input image to upsize the resolution two times horizontally and vertically, and produces an intermediate image free from jagging artifacts that can occur during the resolution conversion. The linear filtering unit 200 applies linear FIR (Finite Impulse Response) filtering to the intermediate image output from the edge-directed interpolation unit 100 while changing a sampling rate, thereby producing an image having the same resolution as a desired resolution, that is, the linear filtering unit 200 produces an output image having the same resolution as a desired resolution, minimizing the occurrence of ringing artifacts and aliasing artifacts in such a manner. Since the edge-directed interpolation unit 100 and the linear filtering unit 200 degrade sharpness during the resolution conversions, the sharpness improvement unit 300 compensates for the sharpness and produces a final image.

The resolution-converting apparatus as constructed above can be more clearly understood with detailed description on the edge-directed interpolation unit 100, the linear filtering unit 200, and the sharpness improvement unit 300.

Figure 2:
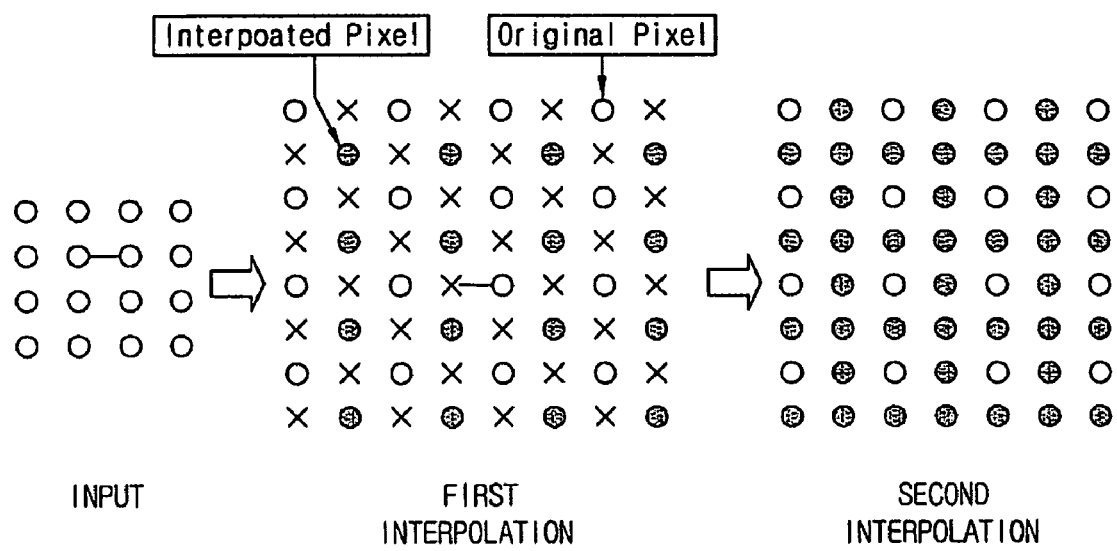
FIG. 2 illustrates interpolated pixels created by interpolation of edge-directed interpolation unit of FIG. 1.

FIG. 2 illustrates interpolated pixels generated by the interpolation of the edge-directed interpolation unit 100 of the resolution-converting apparatus of FIG. 1. In FIG. 2, the edge-directed interpolation of the edge-directed interpolation unit 100 is performed through a two-step process of first and second interpolations. The first interpolation produces interpolated pixels at odd lines and columns through the edge-directed interpolation, and the second interpolation produces the remaining interpolated pixels through the edge-directed interpolation. The first and second interpolations change only positions of original pixels for reference, and use the same edge-directed interpolation to produce interpolated pixels.

Figure 3:
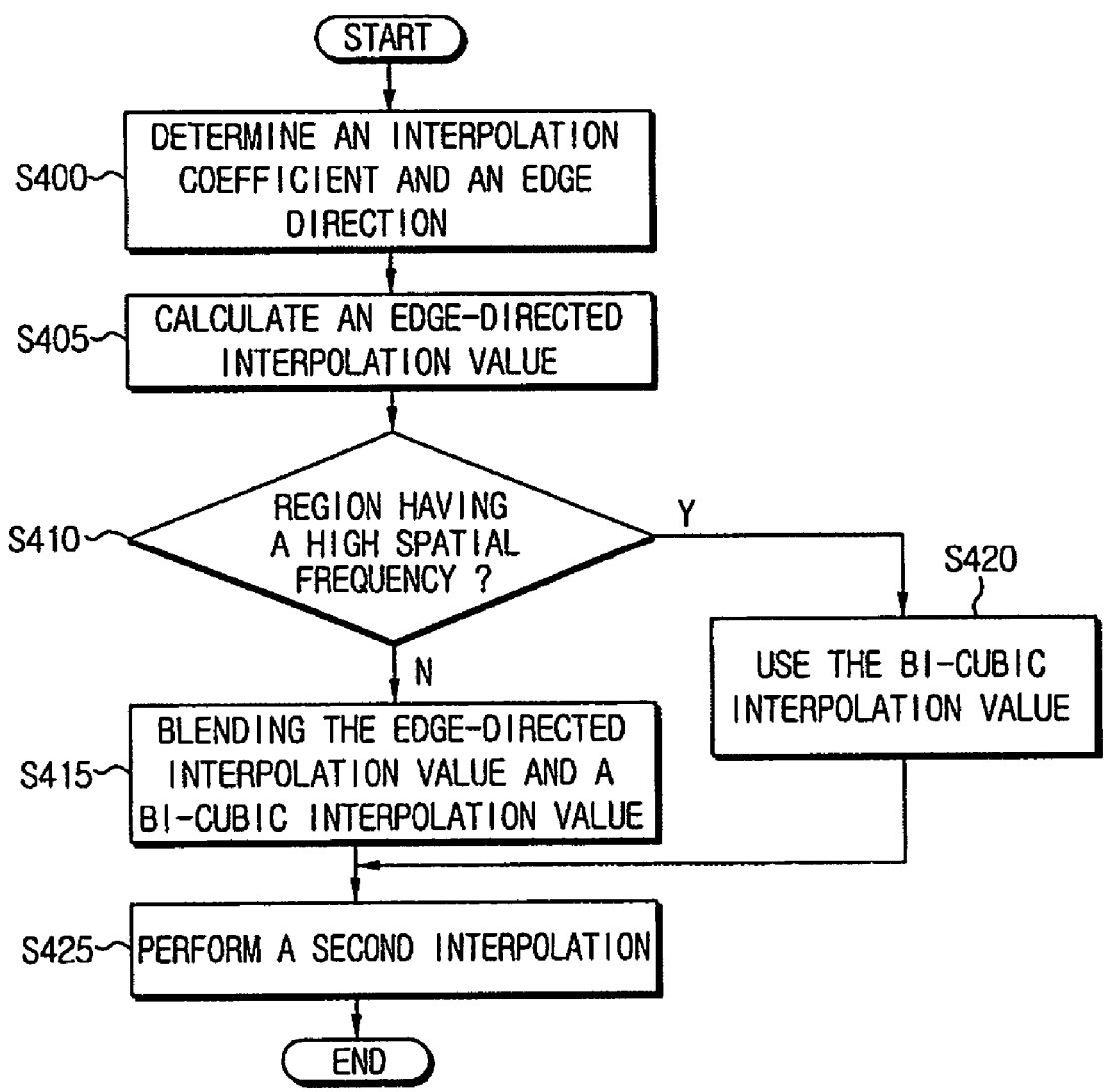
FIG. 3 is a flowchart of operations of the edge-directed interpolation unit of FIG. 1.
Figure 4A:
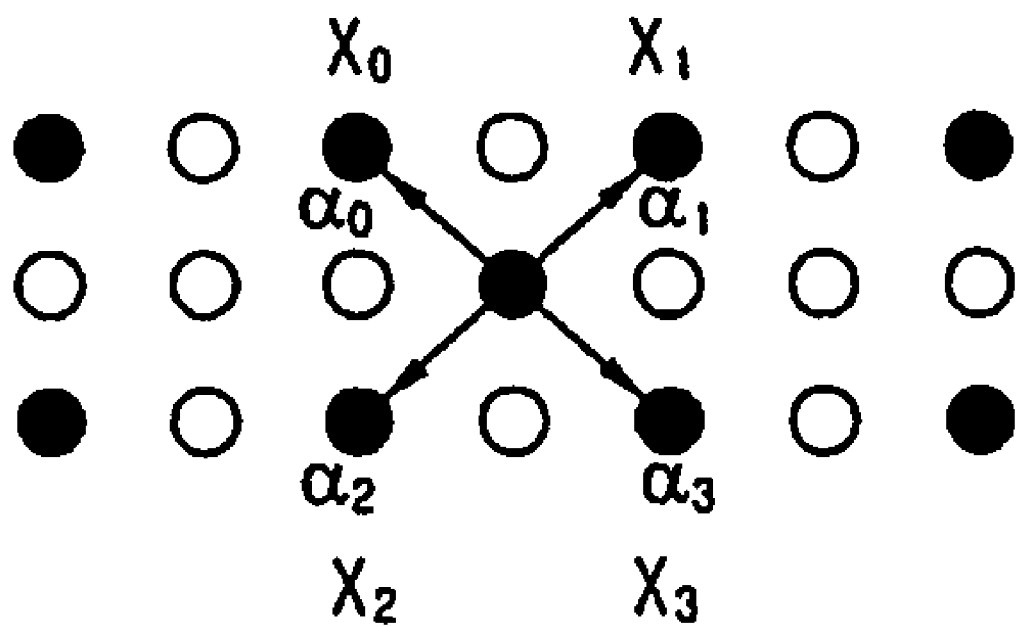
FIG. 4A and FIG. 4B illustrate direction estimation in the edge-directed interpolation.
Figure 4B:
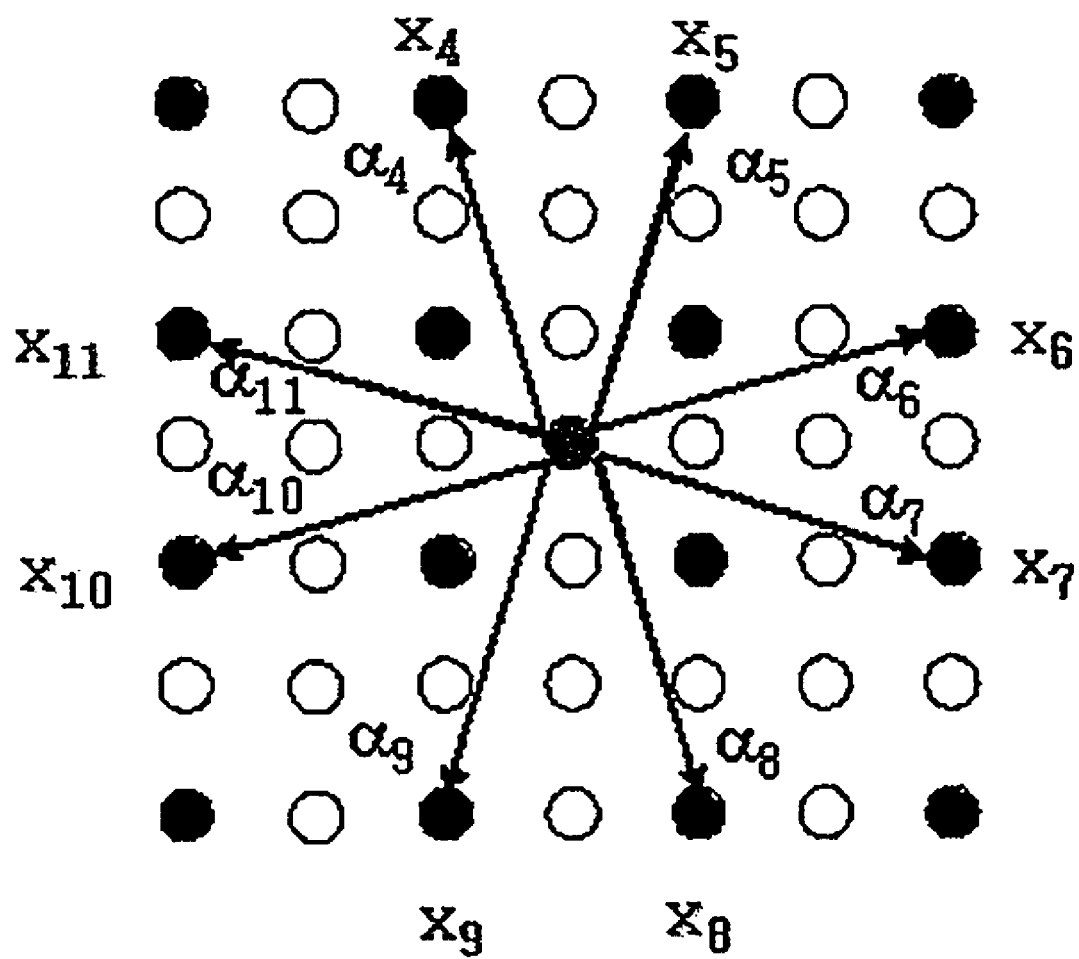

FIG. 3 is a flowchart for explaining the operations of the edge-directed interpolation unit 100 of the resolution-converting apparatus of FIG. 1. In FIG. 3, the edge-directed interpolation unit 100 first determines an interpolation coefficient and edge direction (S400), and applies the edge-directed interpolation and calculates an edge-directed interpolation value depending on the determined interpolation coefficient and edge direction (S405). The edge-directed interpolation applied in the edge-directed interpolation unit 100 estimates total six edge directions including two diagonal directions shown in FIG. 4A and four non-diagonal directions shown in FIG. 4B.

The edge-directed interpolation unit 100 calculates an edge-directed interpolation value using one of the diagonal direction interpolation $Y_{EDI-Diag}$ and the non-diagonal direction interpolation $Y_{EDI-NonDiag}$ as follows, depending on an edge direction and an interpolation coefficient that are determined by a process to be later described.

[Equation 1]

$$Y_{EDI\_Diag} = \sum_{i=0}^{3} \alpha_i \times X_i$$ [Equation 1]

$$\sum_{i=0}^{3} \alpha_i = 1$$

$$Y_{EDI\_Non\_Diag} = \sum_{i=4}^{11} \alpha_i \times X_i$$ [Equation 2]

$$\sum_{i=4}^{11} \alpha_i = 1$$

The edge-directed interpolation unit 100 uses one of the diagonal direction interpolation of Equation 1 and the non-diagonal direction interpolation of Equation 2. In Equations 1 and 2, the sum of each direction interpolation coefficient $\alpha_1$ becomes 1.

A luminance signal with respect to an RGB signal of each pixel of an input image is obtained through Equation 3, the interpolation coefficient used for the edge-directed interpolation is determined based on the luminance signal, and the determined interpolation coefficient is equally applied to the R, G, and B pixels at the same spatial position.

$$\text{Lightness} = 0.3 \times R + 0.59 \times G + 0.11 \times B$$ [Equation 3]

Figure 5A:
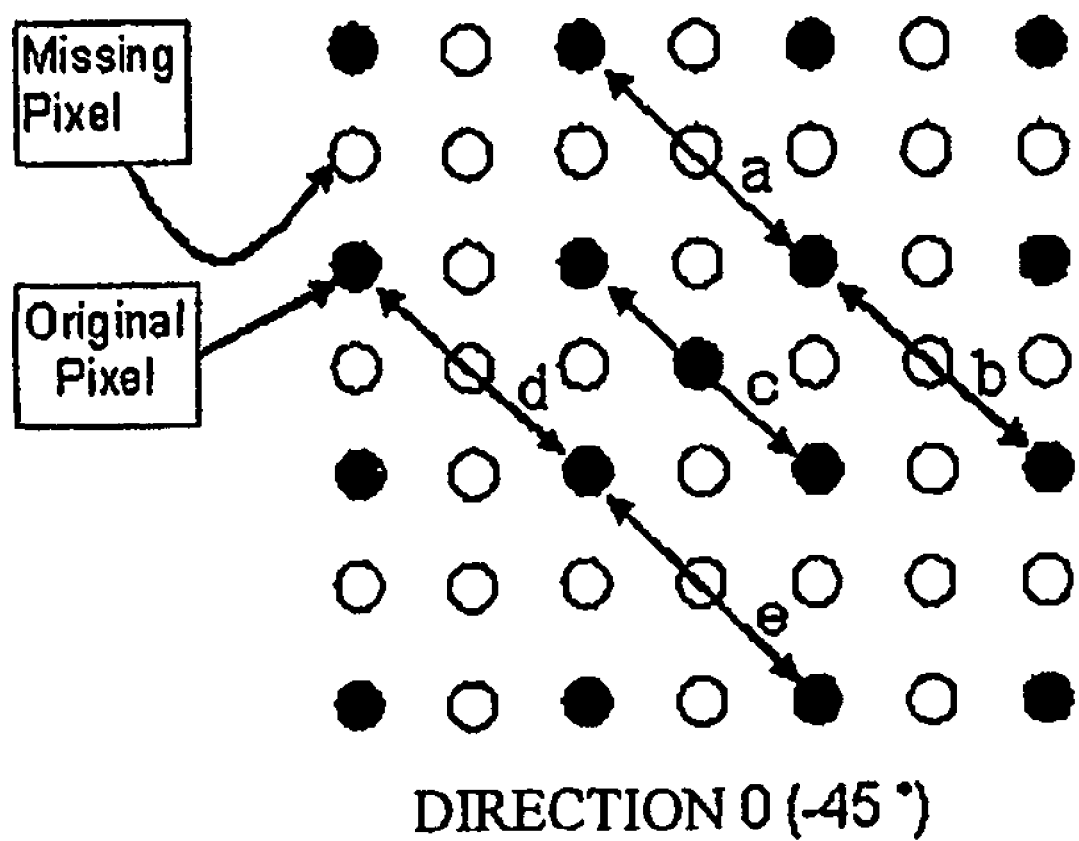
FIG. 5A to FIG. 5F illustrate a decision method of an interpolation coefficient.
Figure 5B:
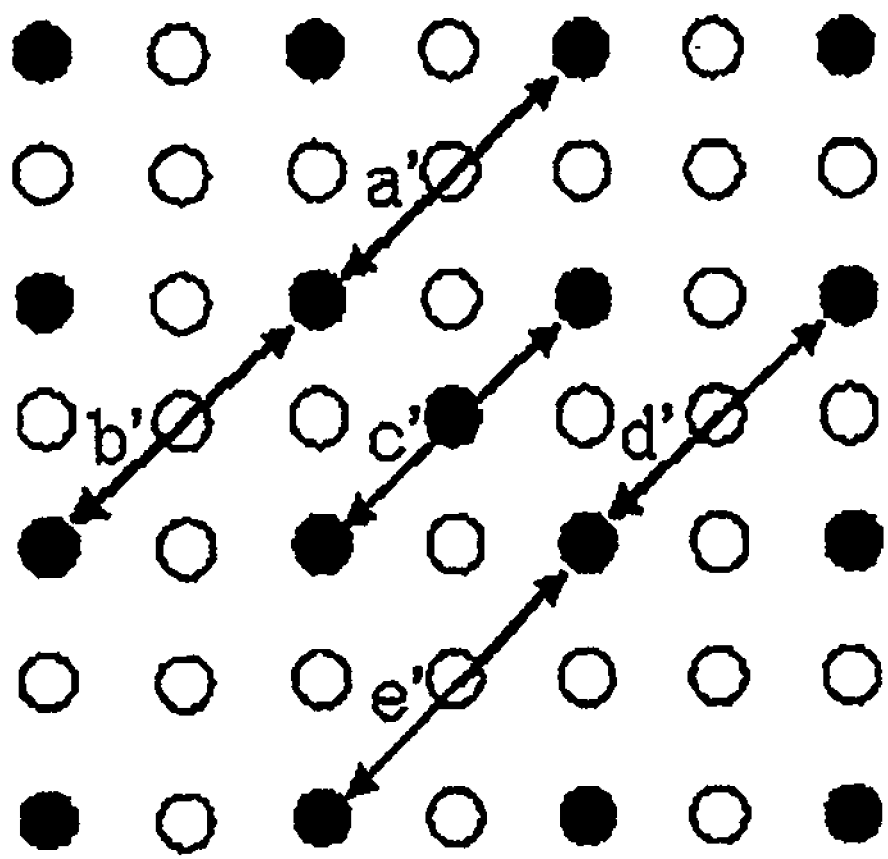
Figure 5C:
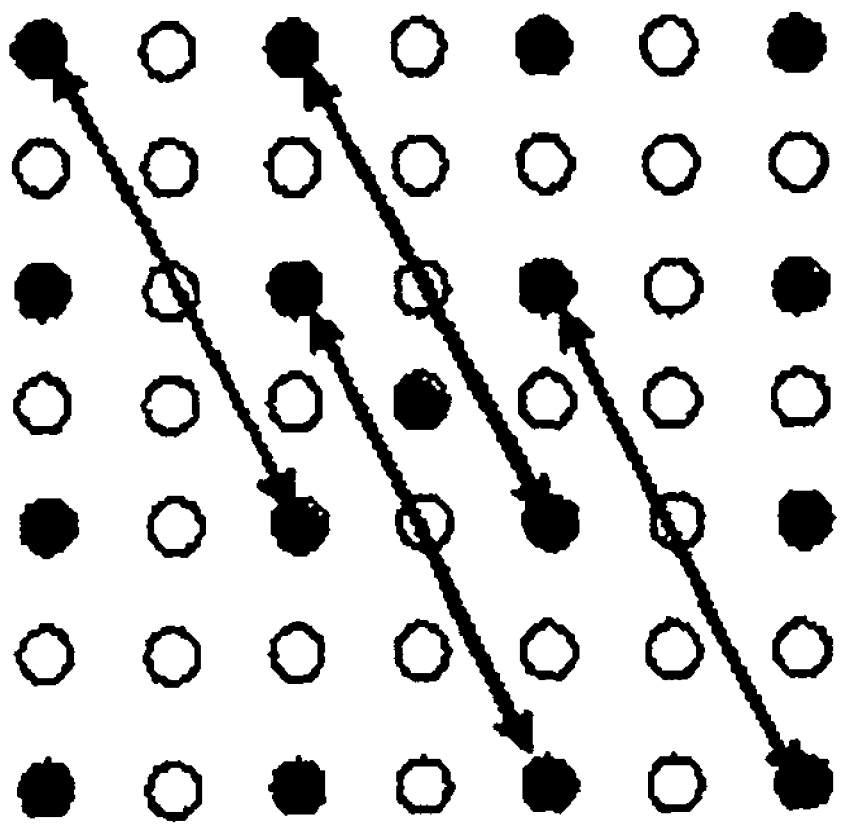
Figure 5D:
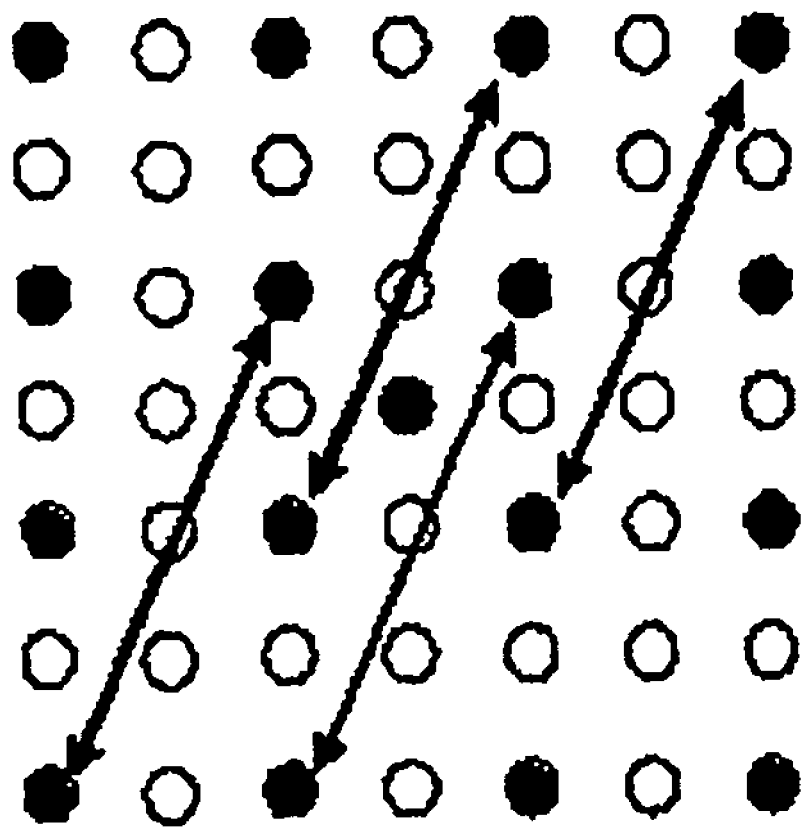
Figure 5E:
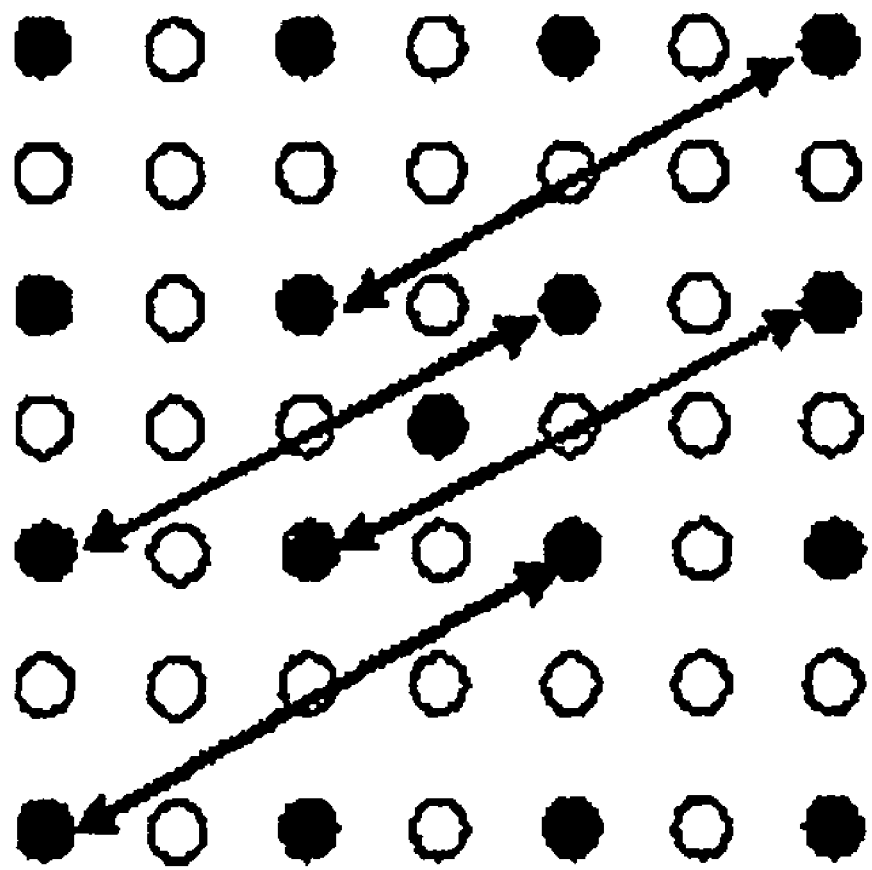
Figure 5F:
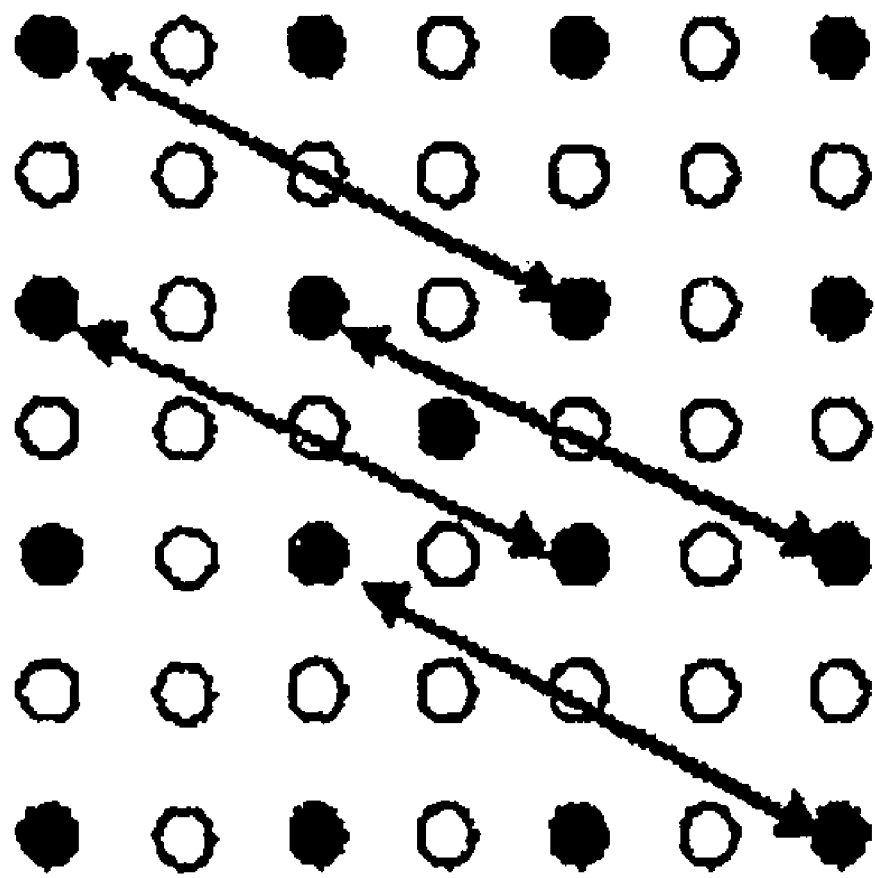

An interpolation coefficient of a diagonal direction is determined by using absolute differences between original pixels of an input image positioned along the diagonal direction. The absolute values between input pixels used to determine the interpolation coefficients of the diagonal direction are shown in FIG. 5A and FIG. 5B, and shown arrows indicate an absolute difference value between two pixels. In the determination of an interpolation coefficient, the sum of absolute difference values between pixels existing in 45° and −45° directions is determined in Equation 4 as below, and, through calculated $Dir_0$ and $Dir_1$, an edge direction is finally estimated in a direction having a minimum value.

$$\begin{aligned}Dir_0 &= a+b+c+d+e \\ &= |P(i-1, j+1) - P(i-3, j-1)| + \\ &\quad |P(i-1, j+1) - P(i+1, J+3)| + \\ &\quad |P(i-1, j-1) - P(i+1, j+1)| + \\ &\quad |P(i-1, j-3) - P(i+1, j-1)| + \\ &\quad |P(i-1, j-1) - P(i+3, j+1)|\end{aligned}$$ [Equation 4]

$$\begin{aligned}Dir_1 &= a'+b'+c'+d'+e' \\ &= |P(i-3, j+1) - P(i-1, j-1)| + \\ &\quad |P(i-1, j-1) - P(i+1, j-3)| + \\ &\quad |P(i-1, j+1) - P(i+1, j-1)| + \\ &\quad |P(i-1, j+3) - P(i+1, j+1)| + \\ &\quad |P(i+1, j-1) - P(i+3, j-1)|\end{aligned}$$ [Equation 5]

Equation 6 to Equation 8 as below are used to determine interpolation coefficients ($\alpha_0, \alpha_1, \alpha_2, \alpha_3$) of four diagonal directions through the magnitude comparison of the $Dir_0$ and $Dir_1$. That is, if the sum of absolute difference values of two diagonal directions is 0, it is considered plain pixels having no edge, and the values of all interpolation coefficients are determined to 0.25 as shown in Equation 6.

if $Dir_0 + Dir_1 = 0$ $\alpha_0 = \alpha_1 = \alpha_2 = \alpha_3 = 0.25$ [Equation 6]

If the sum of the absolute difference values of the two diagonal directions is not 0 and the absolute difference value of −45° is smaller, the interpolation coefficient is determined as shown in Equation 7 as below through the magnitude comparison with the absolute difference value of the 45° direction.

[Equation 7]

if ($Dir_0 + Dir_1 > 0$ and $Dir_1 \leq Dir_0$)
{
    if ($2 \times Dir_0 > Dir_1$) $\alpha_0 = \alpha_3 = 0.3, \alpha_1 = \alpha_2 = 0.2$
    else $\alpha_0 = \alpha_3 = 0.5, \alpha_1 = a_2 = 0.0$
}

If the absolute difference value of the 45° direction is smaller, the interpolation coefficient is determined as shown in Equation 8 as below in the same manner as the −45° direction.

[Equation 8]

if ($Dir_0 + Dir_1 > 0$ and $Dir_1 \leq Dir_0$)
{
    if ($2 \times Dir_1 > Dir_0$) $\alpha_0 = \alpha_3 = 0.2, \alpha_1 = \alpha_2 = 0.3$
    else $\alpha_0 = \alpha_3 = 0.0, \alpha_1 = \alpha_2 = 0.5$
}

An interpolation coefficient of the non-diagonal direction is determined, with different reference pixel position, by applying the same method as the decision of an interpolation coefficient of the diagonal direction. FIG. 5C to FIG. 5F show pixel groups used for the edge direction decision in the non-diagonal direction. First, if an average value of absolute values in four directions is 0, it is considered a plain region, and, as shown in Equation 9 as below, all the interpolation coefficients of eight pixels are determined to 0.125.

$Avg_{Dir} = (Dir_2 + Dir_3 + Dir_4 + Dir_5)/4$ if $Avg_{Dir} = 0$ $\alpha_4 = \alpha_5 = \alpha_6 = \alpha_7 = \alpha_8 = \alpha_9 = \alpha_{10} = \alpha_{11} = 0.125$ [Equation 9]

Meanwhile, the interpolation coefficient is set to 0.5 with respect to only two pixels in a direction having a smallest value among four non-diagonal directions Dir2, Dir3, Dir4, and Dir5, and the rest is all set to 0, in order to determine an interpolation coefficient. Equation 10 as below shows the decision of an interpolation coefficient in case that the direction Dir2 has the smallest value.

if min{$Dir_2, Dir_3, Dir_4, Dir_5$} = $Dir_2$ $\alpha_4 = \alpha_8 = 0.5, \alpha_5 = \alpha_6 = \alpha_7 = \alpha_9 = \alpha_{10} = \alpha_{11} = 0$ [Equation 10]

The following equation is applied to determine a final edge direction interpolation value at a current interpolation pixel position, that is, at a pixel to be interpolated, by using maximum, minimum, and average values of absolute difference values used for the interpolation coefficient decision in each edge direction, so the edge direction interpolation value is calculated by using any of Equation 1 and Equation 2.

if (Avg{$Dir_2, \ldots, Dir_5$}×Min{$Dir_0, Dir_1$}<Max{$Dir_0, Dir_1$}×Min{$Dir_2, \ldots, Dir_5$}) $Y_{EDI} = Y_{EDI\text{-}Diag}$ [Equation 11]

if (Avg{$Dir_2, \ldots, Dir_5$}×Min {$Dir_0, Dir_1$}≧Max{$Dir_0, Dir_1$}×Min{$Dir_2, \ldots, Dir_5$}) $Y_{EDI} = Y_{EDI\_Non\_Diag}$ [Equation 12]

Next, it is determined whether the position is in a region of high spatial frequency (S410). If not in the region of high spatial frequency, the edge-directed interpolation value and a bi-cubic interpolation value are blended so that a final interpolation value is calculated (S415). That is, in case that the edge-directed interpolation is used and the edge direction is dominant, the excellent interpolation result can be generally obtained where jagging artifacts are removed from edges. In case that a non-dominant direction such as a texture region exists, adverse effect is exerted on the interpolation result. Therefore, with respect to such a region, the linear interpolation method such as bi-cubic interpolation rather provides a better result in the aspect of image quality. Accordingly, if a region does not have a high spatial frequency, the aforementioned image quality is prevented from being degrading by blending the final direction interpolation value and the bi-cubic interpolation value (S410 and S415), which can be expressed in Equation 13 as follows.

$R_{out} = R_{biCubic} \times (1 - f\text{Blend}) + f\text{Blend} \times R_{EDI}$ $G_{out} = G_{biCubic} \times (1 - f\text{Blend}) + f\text{Blend} \times G_{EDI}$ $B_{out} = B_{biCubic} \times (1 - f\text{Blend}) + f\text{Blend} \times B_{EDI}$ [Equation 13]

In Equation 13, fBlend indicates a value determining a blending extent, having a value between $0 \leq f\text{Blend} \leq 1$. The fBlend constant is determined based on Equation 14 if a final edge direction is the diagonal direction, or based on Equation 15 if the final edge direction is the non-diagonal direction, by using absolute difference values of Dir0 to Dir5 obtained in the edge direction decision steps.

if Min($Dir_0, Dir_1$)×2>Max($Dir_0, Dir_1$) fBlend=0.25 else if Min($Dir_0, Dir_1$)×4>Max($Dir_0, Dir_1$) fBlend=0.5 else fBlend=1.0 [Equation 14]

if Min($Dir_2, \ldots Dir_5$)×2>Avg($Dir_2, \ldots, Dir_5$)
    fBlend=0.25 else if Min($Dir_2, \ldots, Dir_5$)×4>Avg($Dir_2, \ldots, Dir_5$)
    fBlend=0.5 else fBlend=1.0 [Equation 15]

That is, since the region has a distinct edge direction if a sum of minimum absolute difference values determining a final edge direction is relatively larger than a sum of absolute difference values indicating different directions, the fBlend value is increased to more reflect the edge-directed interpolation value with respect to a final interpolation result value, so as to remove the jagging artifacts from an edge.

Such a blending method brings an excellent result with respect to most images, but, in the regions having a very high spatial frequency, most edge-directed interpolations based on minimum absolute differences have a high possibility of errors in estimating an edge direction, and the linear blending itself has a limitation in preventing image-quality degradation caused by the edge-directed interpolation.

There can be a method of increasing the number of edge directions estimated for preventing such degradation. However, since the edge intervals become tightly close so that the precision of the edge direction estimation using minimum absolute difference values as to ambient pixels is degraded, the effect can be considered to be insignificant compared to the increase of a computation amount. Therefore, the edge-directed interpolation unit 100 detects a region having a high spatial frequency and compulsorily applies the 4-tab bi-cubic interpolation result (fBlend=0) in case of pixels classified to a high-frequency region (S410 and S420).

Figure 6:
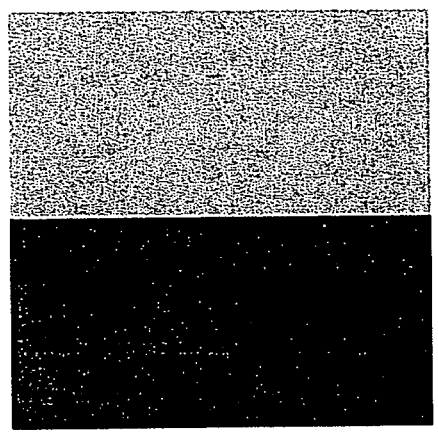
FIG. 6 illustrates a block distribution.
Figure 6:
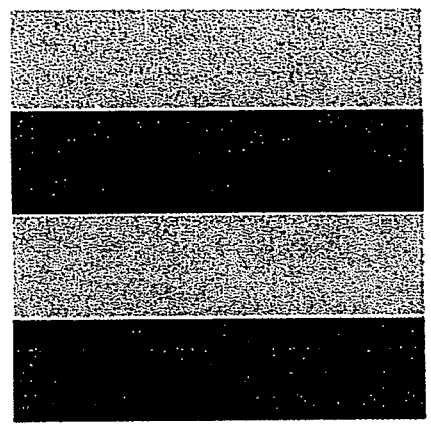
Figure 6:
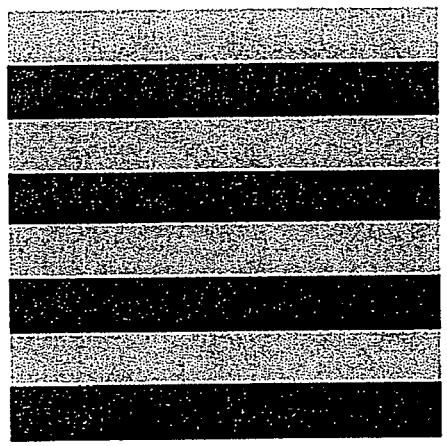
Figure 6:
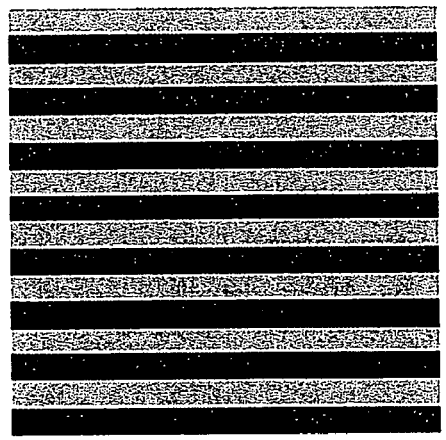

Furthermore, variance is used to detect a high spatial frequency, but using the variance has a disadvantage because information itself from the variance does not match with human vision characteristics as well as the variance does not give information about an exact spatial frequency. Accordingly, the use of variance degrades the precision in detecting the regions having a high spatial frequency that bring about the deterioration of image quality due to the edge-directed interpolation. FIG. 6 is a view for showing four blocks each having the same variance value of 5625 and a different spatial frequency. As shown in FIG. 6, the blocks can have the same variance value and different spatial frequencies. In order to solve such a problem, the edge-directed interpolation unit 100, instead of considering each pixel of a block, calculates variance by using differences as to average values of neighboring pixels of each pixel based on Equation 16 as below, and determines whether the block is a region having a high spatial frequency. The consideration of such mean-deviated local variance has an advantage of precisely expressing the variance of pixel value variation in a block.

$$P_{mean}(i, j) = \frac{1}{8} \times [P(i-1, j-1) + P(i-1, j) + P(i-1, j+1) + P(i, j-1) + P(i, j+1) + P(i+1, j-1) + P(i+1, j)]$$ [Equation 16]

$$V_{ar} = \frac{1}{N \times N} \sum_{i=1}^{N-1} \sum_{j=1}^{N-1} [P(i, j) - P_{mean}(i, j)]^2$$

Equation 16 results in mean-deviated local deviances (a) 395.5, (b) 1186.5, (c) 2768.5, and (d) 12656.5, respectively, with respect to the four blocks having different spatial frequencies, as shown in FIG. 6, when felt or perceived by human eyes, so the values increase as the spatial frequencies go higher. Therefore, considering the block as a region having a high spatial frequency if the value is larger than a threshold value, the edge-directed interpolation unit 100 uses the mean-deviated local deviances to force the bi-cubic interpolation to be applied, so as to prevent the image-quality deterioration due to the edge-directed interpolation in the region having a very high spatial frequency.

Figure 7:
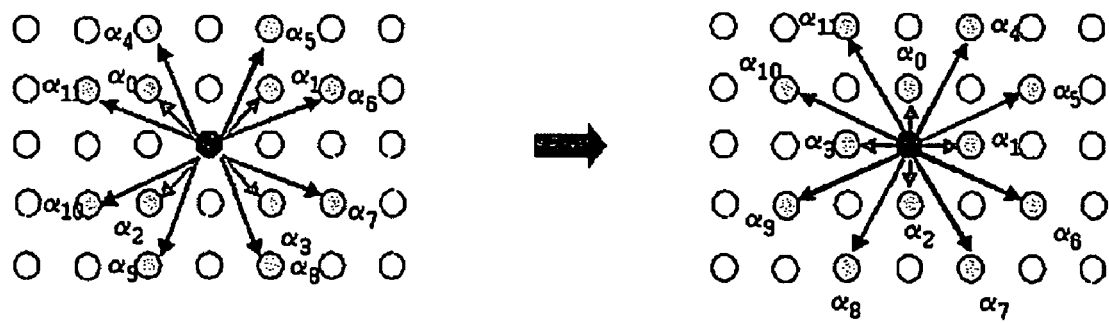
FIG. 7 illustrates a decision method of an interpolation coefficient in the second interpolation.

If the first interpolation is completely done, the edge-directed interpolation unit 100 performs the second interpolation (S425). As for the second interpolation, the edge-directed interpolation 100 applies the edge-directed interpolation itself, but it is different that a reference pixel is 45° rotated in the clockwise direction as shown in FIG. 7.

Figure 8:
FIG. 8 illustrates general sampling conversions.

The linear filtering unit 200 performs a sampling rate conversion process to obtain an output image having an intended resolution with respect to an intermediate image with jagging artifacts minimized at edges after the edge-directed interpolation unit 100 performs the edge-directed interpolation. FIG. 8 illustrates a general sampling rate conversion process. First, an intermediate-converted image is obtained that has L-times more samplings through up-samplings, and, second, output samplings are obtained that has L/M times an input image sampling rate through a down-sampling process for obtaining an output image having an intended resolution. The sampling rate conversion to convert resolution, that is, the function of a re-sampling system is generally determined by a low-pass filter, and the linear filtering unit 200 uses the windowing technique facilitating the determination of filter characteristics even though diverse techniques exist for designing FIR filters for improving the performance of a sampling rate converter, which can be expressed in Equation 17 as follows:

$$h(n) = h_d(n) \times w(n)$$ [Equation 17]

In Equation 17, h(n) denotes an impulse response of a finally designed filter, $h_d(n)$ an impulse response of an ideal filter, and w(n) a window function, respectively.

Since the impulse response of the ideal filter has values of up to ±∞ in the time domain so that the windowing filter design method can not be actually implemented, a windowing function of a definite length is multiplied to obtain an impulse response of a definite length that the ideal impulse response is cut off. Since the multiplication in the time domain becomes a convolution in the frequency domain, the transfer function of a filter to be designed becomes a convolution of a frequency response of an ideal low-pass filter and a Fourier-Transformed value of a window function. The transition bandwidth of a finally designed filter obtained by the above method is determined by the main-lobe width of the Fourier Transform spectrum of a window function, and the ripples of the pass band and the stop band are determined by the magnitude of the side lobe of the window function. Even though diverse window functions exist as window functions used for the windowing method, the linear filtering unit 200 uses the Kaiser window as follows that facilitates the side-lobe magnitude controls.

$$w[n] = \frac{I_0[\beta(1 - [(n-d)/d^2])^{1/2}]}{I_0(\beta)}, \quad 0 \leq n \leq M, d = \frac{M}{2}$$ [Equation 18]

$$w[n] = 0, \quad \text{otherwise}$$

In Equation 18, M as a filter order determines a parameter $$d = \frac{M}{2},$$

β indicates a window shape, and $I_0$ indicates a modified zero-order Bessel function.

The ideal filter for resolution conversion is a filter having a flat response in the pass band and high stop band attenuation characteristics, and one that suppresses the occurrence of ringing artifacts in an image with a low amplitude of the side lobe, having a small number of the side lobes that enable the impulse response of a filter. There are blurring, aliasing, and ringing artifacts as artifacts deteriorating the image quality that can occur upon resolution conversion due to the difficulties in designing such an ideal filter, and the function of the filter can be determined based on the extent of suppressing the occurrence of such image-quality artifact components.

In general, it is difficult to design the FIR filter that can remove all of such artifact components at the same time, and the respective artifacts occur in trade-off relation among them. For example, if the cut-off frequency of a filter is increased to suppress the occurrence of blurring artifacts and fully express the detailed information of an image, the severe aliasing artifacts of high-frequency components of the image occur, leading to the degradation of anti-aliasing characteristics. Conversely, if the cut-off frequency of the filter is lowered to improve the anti-aliasing characteristics, the anti-aliasing characteristics are improved, but the blurring artifacts of an image are increased. Accordingly, controlling the occurrence of the image-quality degradation factors such as ringing, blurring, aliasing artifacts, the linear filtering unit 200 uses an adaptive filter design method facilitating the generation of an output image quality depending upon the application field and user's preference.

The most important factor in designing the windowing-based FIR filter design is known to control the transition bandwidth and the extent of the stop band attenuation, the transition bandwidth is controlled through adjusting a filter length, and the stop bandwidth attenuation is adjusted through the control of a β parameter of the Kaiser window. In general, the cut-off frequency of a filter is fixed in designing a LPF filter, and the filter length is increased as the filter kernel in the spatial domain increases the number of side lobes, and, if the number of side lobes is fixed, the filter length is proportional to the cut-off frequency. That is, as the cut-off frequency is increased, the main-lobe bandwidth of the designed filter kernel is decreased, and, as the cut-off frequency is decreased, the main-lobe width of the filter kernel is increased, the linear filtering unit 200 controls the transition bandwidth by controlling a filter length through max {D,U}× SmoothingAmount for controlling the cut-off frequency of a low-pass filter and nLobes indicating the number of side lobes in the filter kernel in order to convert a sampling rate as shown in Equation 19 as follows:

$$L = \text{round}(\text{Max}\{D,U\} \times \text{SmoothingAmount} \times n\text{Lobes} - 1) \times 2 - 1 \qquad [\text{Equation 19}]$$

In Equation 19, D and U denote values obtained from dividing M and L by a greatest common divisor K of a decimation factor M and an interpolation factor L (that is, D=M/K, U=L/K), and max(D,U) determines the cut-off frequency of a filter.

A filter coefficient in the spatial domain is determined through Equation 20 as follows, i is an argument scaling constant enabling the sinc function being an ideal low-pass filter to have the number of side lobes as many as nLobes within a filter length (0–L–1), which controls the occurrence of artifacts such as ringing by controlling the number of side lobes of the designed filter kernel.

$$h[i] = \left\{\frac{\sin(x)}{x}\right\} \times \text{kaiser}(1, \beta), \, i = 0, 1, \ldots, L-1, \qquad [\text{Equation 20}]$$

$$x = \frac{i - \frac{L-1}{2}}{\frac{L-1}{2}} \times \pi \times n\text{Lobes}$$

The filtering by such a filter design method can be implemented through the general poly-phase filtering, and the filtering is separately applied in the width and length directions to 2D images and video images in order to obtain a final image.

Figure 9:
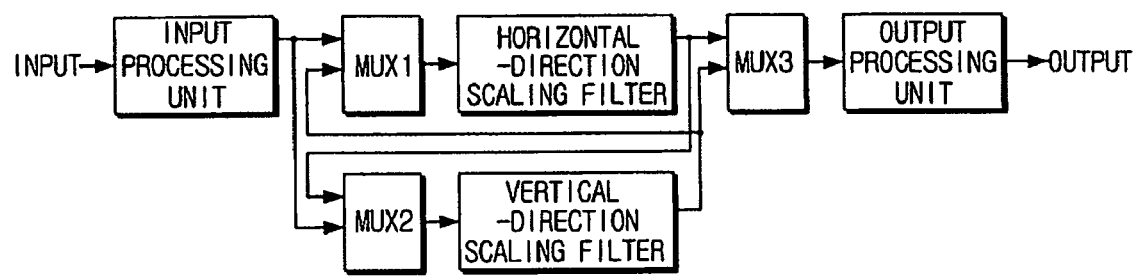
FIG. 9 is a block diagram of a sampling-rate conversion circuit in the linear filtering unit of FIG. 1.

FIG. 9 is a block diagram for showing a sampling rate conversion circuit for 2D images and video images. The poly-phase filtering can be applied for such filtering in consideration of computations and hardware intricacy.

As mentioned above, the edge-directed interpolation unit 100 and the linear filtering unit 200 can remove the occurrence of the jagging, ringing, and aliasing artifacts being the main image-quality degradation factors due to resolution conversion, but, can not prevent the sharpness degradation caused by the reduction of a high-frequency band spectrum of an input signal occurring after the resolution conversion. In order to solve the problem of the sharpness degradation that is most important to ordinary viewers' image-quality perception, the luminance transition improvement (LTI), the detail enhancement, and the like are used to improve the sharpness, but the components of aliasing and ringing artifacts and the like are also improved so that many cases can occur which rather increase the image-quality degradation. Therefore, the sharpness cannot be improved to the ultimate extent. In order to address such a problem, it is necessary to remove the components of ringing artifacts existing in an image having an improved resolution through a resolution conversion technique, for which the sharpness improvement unit 300 uses a sharpness improvement technique that can maximize the sharpness improvement extent through additional removal of such residual components of ringing artifacts.

Figure 10:
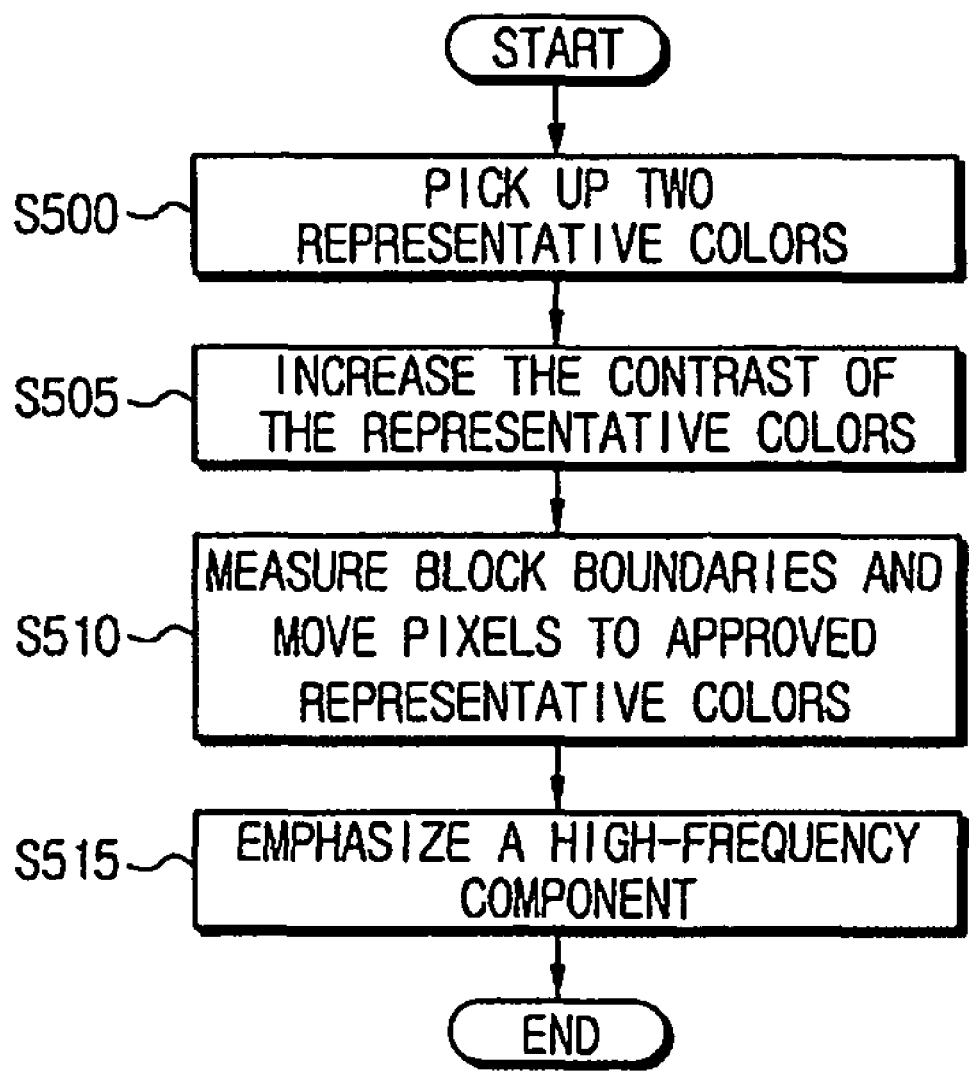
FIG. 10 is a flowchart of operations of the sharpness improvement unit of FIG. 1.

FIG. 10 is a flowchart of the operations of the sharpness improvement unit 300 of FIG. 1. In FIG. 10, the sharpness improvement unit 300 drives the sharpness improvement method based on the overlapped blocks, and, after calculating two representative colors every block, increases the contrast between the calculated representative colors (S500 and S505). The sharpness improvement unit 300 picks up the representative colors based on the K-means algorithm, and, first, uses the Equation 3 to obtain a luminance value with respect to the input RGB signal and picks up as the initial representative colors the RGB values of pixels having the maximum and minimum luminance values in a block. The sharpness improvement unit 300 uses block pixel information based on the initial representative values, applies the K-means algorithm, and updates the initial representative color values. In general, the final representative colors are obtained through the repetitive computations in the process for updating the initial representative color values by using the K-means algorithm, but the number of repetitive computations can be limited to once in order to implement hardware.

Figure 11:
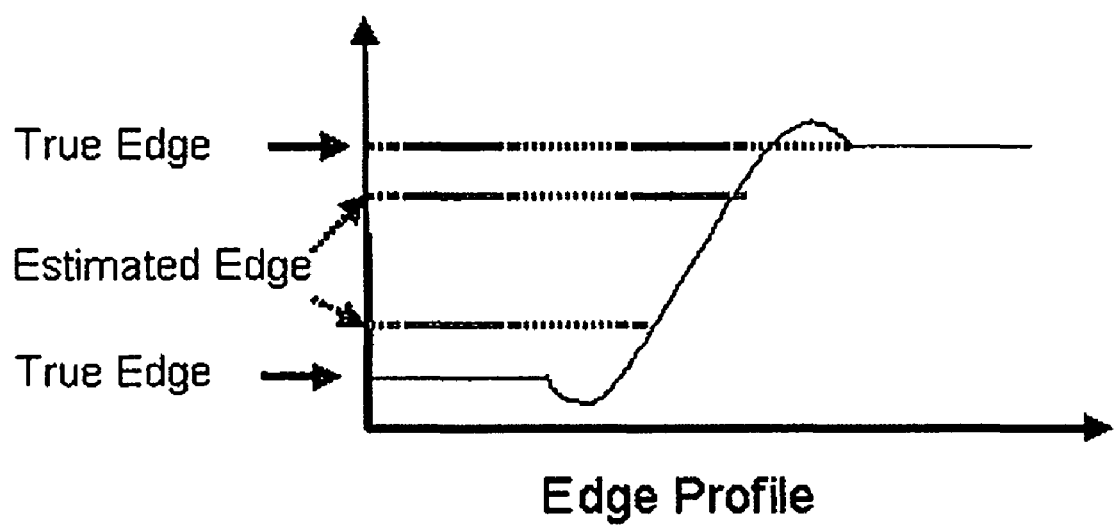
FIG. 11 illustrates errors between actual edge components and estimated edge components.

FIG. 11 shows errors between a real edge component and an estimated edge component in a block due to the repetitive computation limitations for updating representative colors. Since the initial representative colors are determined by the maximum and minimum luminance values, it can be considered that the two estimated representative colors indicate two color components consisting of edge components in a block. As shown in FIG. 11, errors occur between the real edge component and the estimated edge component due to the limitation of the repetitive computation of the K-means algorithm to once, and, in order to compensate for the errors, the problem of the repetitive computation limitation condition is solved by increasing the contrast between the two representative colors.

After the contrast between the representative colors is increased, an input pixel value is changed based on the two most adjacent representative colors with respect to all input pixels in a block, and the ringing component is removed (S510). After passing through a high-frequency component improvement block based on a simple unsharp masking in order to improve sharpness with respect to block data from which the ringing component is removed, a final image is obtained (S515).

Figure 12:
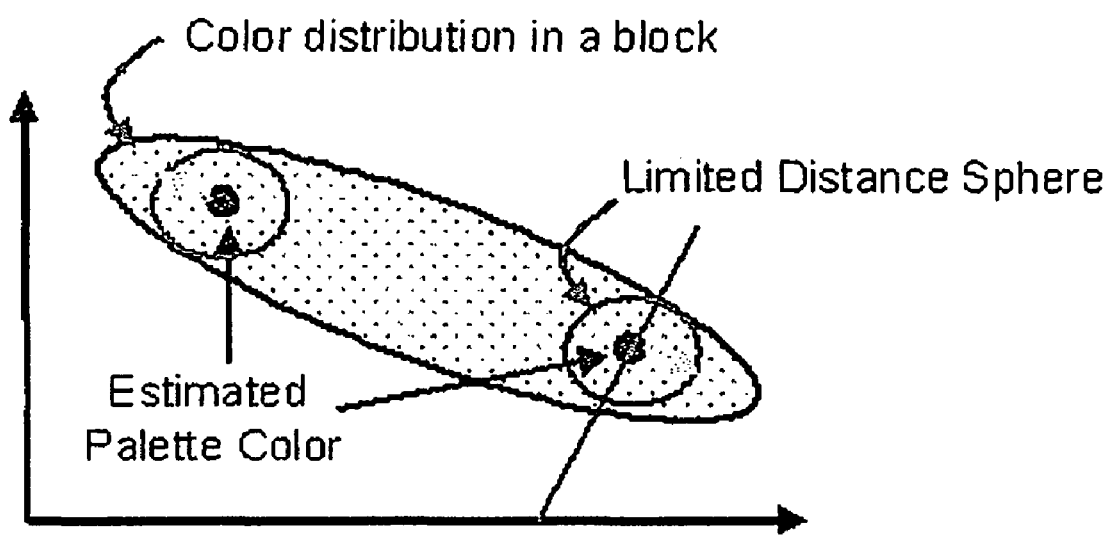
FIG. 12 illustrates improvement of contrast between representative colors.

FIG. 12 illustrates the contrast increase between the two representative colors on the two-dimensional plane. The two points in FIG. 12 indicate two representative colors estimated by the K-means algorithm, and the big ellipsoid enclosing the representative colors indicates the color distribution of block data. The contrast-increasing direction of the two representative colors is indicated in arrows for approximation to the representative colors of the real edge component, and the circles indicate regions established for preventing the excessive increase of contrast. In a process for improving the contrast of the representative colors, the representative color values are updated by using the distance and the dot product between the other representative colors different from input pixels of a block with respect to one representative color.

Figure 13:
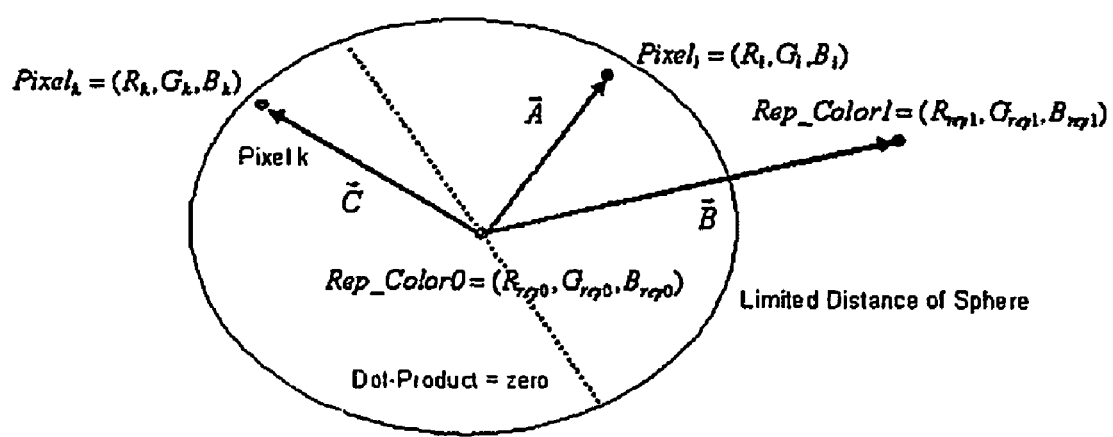
FIG. 13 illustrates a method improving contrast between representative colors.

FIG. 13 depicts a contrast increase method between the representative colors. In FIG. 13, Rep_Color0 and Rep_Color1 indicate the two representative colors, and Pixel$_i$ and Pixel$_k$ indicate colors in a predetermined block. As for the Pixel$_i$, the Equations 21 and 22 as below explain the selection of input colors for updating the initial representative colors.

$$Dist = (R_{rep0} - R_i)^2 + (G_{rep0} - G)^2 + (B_{rep0} - B_i)^2 \quad \text{[Equation 21]}$$

$$\begin{aligned} \text{Dot Product} &= \vec{A} \cdot \vec{B} \quad \text{[Equation 22]}\\ &= (R_i - R_{rep0}) \times (R_{rep1} - R_{rep0}) +\\ &\quad (G_i - G_{rep0}) \times (G_{rep1} - G_{rep0}) +\\ &\quad (B_i - B_{rep0}) \times (B_{rep1} - B_{rep0}) \end{aligned}$$

The Equation 21 indicates a distance between the input color Pixel and the representative color Rep_Color0, and the Equation 22 indicates a dot product between two vectors $\vec{A}$, $\vec{B}$ formed by the two representative colors and the input color. If the input color is in a region for preventing the excessive contrast increase or the dot product is a negative number, candidate colors are picked up for updating the representative colors, and the candidate colors are used to update the representative colors.

if Dist<Limit_Dist & & Dot_Product<0 Use the color undate otherwise Skip [Equation 23]

The Limit_Dist value for preventing the excessive contrast increase is defined by Equation 24 as follows:

$$\text{Limit-Dist} = |(R_{rep0} - R_{rep1})^2 + (G_{rep0} - G_{rep1})^2 + (B_{rep0} - B_{rep1})^2| >> 4 \quad \text{[Equation 24]}$$

After the candidate pixels are determined by applying the above computation to the two representative colors with respect to all the pixels in a block, the K-means algorithm is applied to obtain the updated representative colors. After the computation of a final representative color having an improved contrast, the proximity of pixels in the block is measured by neighboring representative colors and adaptively transited so that the ringing artifacts are removed. If the input color is located in the middle of the two representative colors, the input value itself is output without color transition, and, as the input color is closer to a neighboring representative color or the edge component in a block is stronger, the extent of color transition is increased. In order to transit colors by using the representative colors, it is necessary to measure the edge strength and the proximity between the two representative colors and the current input color, and the method of determining the edge strength is as follows:

$$\text{Rep-Dist} = \sqrt{(R_{rep0} - R_{rep1})^2 + (G_{rep0} - G_{rep1})^2 + (B_{rep0} - B_{rep1})^2} \quad \text{[Equation 25]}$$

$$\text{Dist} = |R_i - R_{rep-i}| + |G_i - G_{rep-i}| + |B_i - B_{rep-i}| \quad \text{[Equation 26]}$$

The Equation 25 indicates a distance between the representative colors, and the Equation 26 indicates a distance between the representative colors containing the input pixel and the current input pixel determined upon the application of the K-means algorithm, and the strength of a final edge component with respect to the current input block is obtained by using the pseudo-code and the Equation 27.

for $i$: $i ==$ BlockHeight. $i$++ [Equation 27]
for $j$: $j ==$ BlockWight. $j$++
  $Dist = |R_{i,j} - R_{rep-i,j}| + |G_{i,j} - G_{rep-i,j}| + |B_{ij} - B_{rep-i,j}|$
  if $(Dist \times 4 > \text{Rep\_Dist}) TotalDiat += Dist$
Edge − Measure = $TotalDist \times k$ In order to obtain a color adjacent to the current input color of the two representative colors, a distance between each representative color and the current input color is computed as follows. Dist0 indicates a distance between the current input pixel and the representative color determined upon application of the K-means algorithm, and Dist1 indicates a distance between the other representative colors.

$$\text{Dist0} = (R_i - R_{rep0})^2 + (G_i - G_{rep0})^2 + (B_i - B_{rep0})^2 \quad \text{[Equation 28]}$$

$$\text{Dist1} = (R_i - R_{rep1})^2 + (G_i - G_{rep1})^2 + (B_i - B_{rep1})^2 \quad \text{[Equation 29]}$$

The final proximity using the distance between the two representative colors and the current input color is expressed in Equation 30 as follows:

$$\text{Proximity} = \frac{Dist0}{Dist1}. \quad \text{[Equation 30]}$$

In Equation 30, the proximity indicating an adjacent degree is clipped to have a value between 0~1, and the value is decreased as it comes closer to the representative color of the current input pixel. The extent of the final color transition is increased as the edge strength in a block is increased or a distance with a neighboring color becomes smaller, which can be obtained based on Equation 31 as follows:

$$R_{i-mod} += (1 - \text{Proximity}) \times \text{Edge-Measure} \times (R_i - R_{rep-1})$$

$$G_{i-mod} += (1 - \text{Proximity}) \times \text{Edge-Meaure} \times (G_i - G_{rep-1})$$

$$B_{i-mod} += (1 - \text{Proximity}) \times \text{Edge-Meaure} \times (B_i - B_{rep-1}) \quad \text{[Equation 31]}$$

Figure 14:
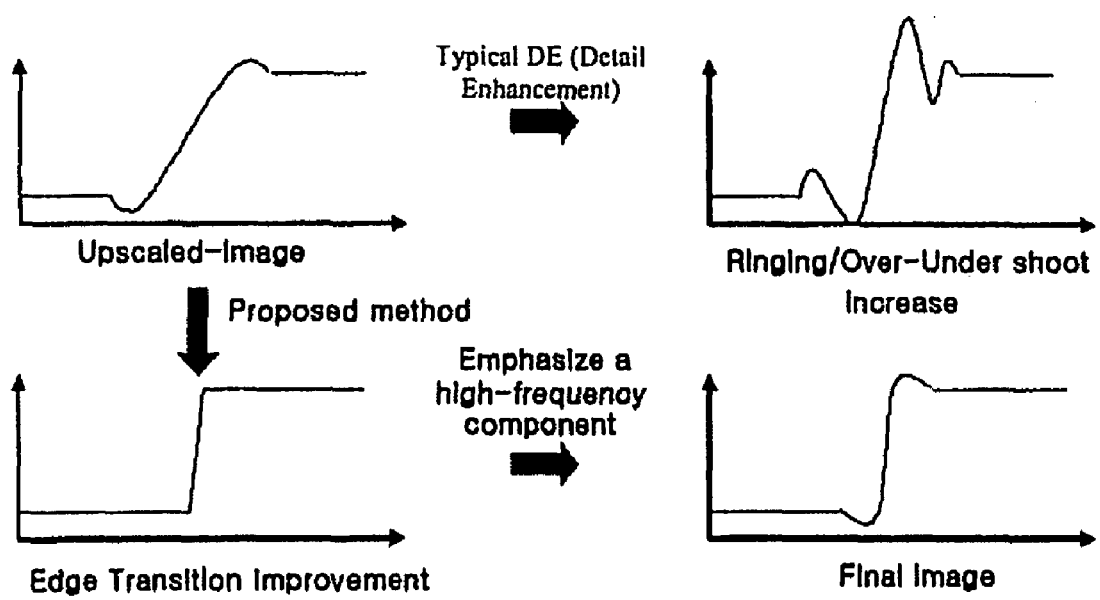
FIG. 14 illustrates a final image processed in the sharpness improvement unit of FIG. 1.

FIG. 14 depicts a final image processed in the sharpness improvement unit 300. In FIG. 14, the resolution-converted input image can have residual ringing artifacts, and, if the detail enhancement is applied by a post-process method with respect to the input image, the ringing component is also improved so that the image quality can be degraded. Since the sharpness improvement unit 300 obtains the two representative colors in a block and moves the pixel values of the block with respect to the representative colors, the sharpness improvement unit 300 removes the ringing components at the same time of performing a function similar to the LTI or CTI. As above, a simple unsharp masking technique is applied to the ringing component-removed block about the representative colors to improve the sharpness, so that a final output image can be obtained that has the improved sharpness and the minimized emphasis of the ringing artifacts and the like.

Meanwhile, since such a sharpness improvement method is the computation based on blocks, there can occur a discontinuity problem at the boundaries between blocks appearing in the block-based compression method such as JPEG and MPEG in case that each of the independently processed blocks is output as it is. In order to improve such a problem, the sharpness improvement unit 300 operates based on an overlapped block structure, and removes the discontinuity that can occur at the boundaries of the processed blocks by using the Hanning window. That is, the input image is overlapped by half the entire block size to construct a block (for example, the input block is overlapped by 4 pixels with neighboring blocks in case of the size of the input block is 8×8), and enables each of the independently processed blocks to be smoothly transited at the boundaries between neighboring blocks by using the Hanning window, so as to remove the discontinuity.

Figure 15:
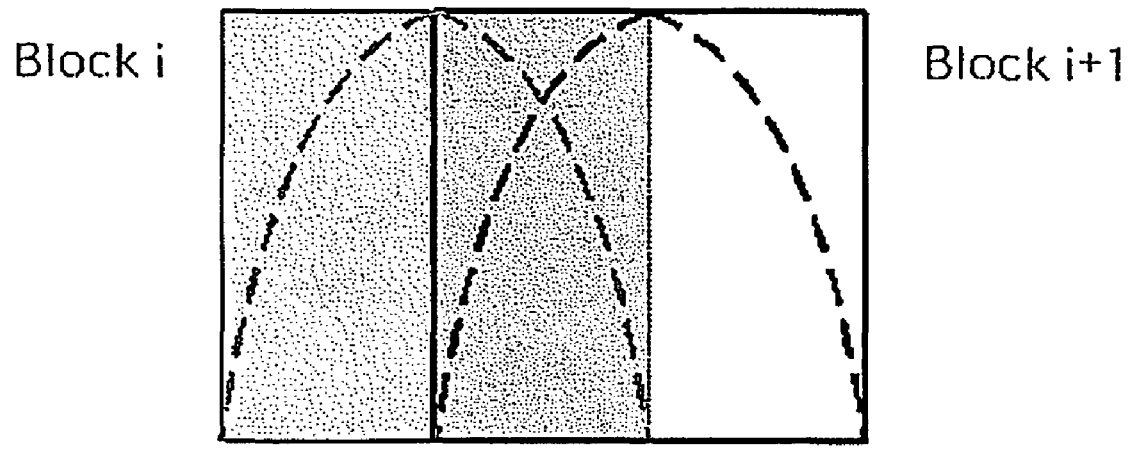
FIG. 15 illustrates block discontinuity removal.

FIG. 15 is a conceptual view of the smooth transition using the Hanning window at the boundaries between two neighboring blocks. In FIG. 15, a two-dimensional Hanning window is multiplied by each of the independently processed block data, (FIG. 14 is for description in the one-dimensional form) the block data multiplied by a window coefficient is added with each other to obtain a final block data. The window function multiplied by each block is distributed in a form having a block boundary direction at one side and fading in from the block boundary direction at the other side, and the sum of two window function coefficients at the overlapped block boundary portion becomes 1 all the time, so that the smooth transition without distortion can be achieved.

As aforementioned, the present invention can solve the problem of jagging artifacts, ringing artifacts, sharpness degradation, and the like which are image-quality degradation factors that can occur when the conventional resolution conversion method is used. Furthermore, the FIR filter design technique used in the linear filtering unit has an advantage of facilitating the filter design by changing filter design parameters in the spatial domain depending on application fields or users' preference. The edge-directed interpolation filter simplifies the edge direction estimation, adaptively blends the problem of aliasing characteristics degradation existing in a general non-linear filter with a simple 4-tab bi-cubic interpolation result through the classification of input images, so as to improve the anti-aliasing characteristics and minimize the jagging artifacts at edges. In particular, the sharpness improvement unit effectively removes residual ringing artifacts in a resolution-converted image, so as to effectively improve the sharpness of the resolution-converted image through the application of the simple unsharp mask as well as replace the conventional detail enhancement method that is independently used.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A resolution-converting method, comprising:
    applying an edge-directed interpolation to an input image and producing an intermediate image; and
    converting a sampling rate with respect to the intermediate image and producing an output image having a predetermined resolution,
    wherein the edge-directed interpolation comprises,
    a first interpolation of generating interpolated pixel of a part of the input image, and
    a second interpolation of generating interpolated pixels of other remaining part of the input image.

2. The resolution-converting method as claimed in claim 1, wherein the edge-directed interpolation comprises:
    using absolute differences of pixels of the input image to estimate an edge direction;
    adaptively determining an interpolation coefficient based on a pixel value of a position corresponding to the estimated edge direction;
    using the edge direction and the interpolation coefficient and calculating an edge-directed interpolation value; and
    adaptively blending the edge-directed interpolation value and an interpolation value by a predetermined linear interpolation method and calculating a final interpolation value.

3. The resolution-converting method as claimed in claim 2, wherein the edge direction is estimated with respect to two diagonal directions and four non-diagonal directions.

4. The resolution-converting method as claimed in claim 2, wherein the predetermined linear interpolation method is a bi-cubic interpolation method.

5. The resolution-converting method as claimed in claim 2, further comprising determining whether an interpolation region has a high spatial frequency, and, if the region has a high spatial frequency, using an interpolation value by the predetermined linear interpolation method to calculate a final interpolation value.

6. The resolution-converting method as claimed in claim 5, wherein it is determined whether the region has the high spatial frequency by using mean-deviated local variance in the interpolation region.

7. A resolution-converting method, comprising:
    applying an edge-directed interpolation to an input image and producing an intermediate image; and
    converting a sampling rate with respect to the intermediate image and producing an output image having a predetermined resolution,
    wherein the calculating the output image comprises:
    multiplying a ratio of up-samplings and down-samplings calculated according to the resolution of the input image and a predetermined resolution and calculating the number of filter tabs;
    multiplying a window function by a sinc function and calculating a first-order filter coefficient by the number of filter tabs;
    using a value obtained from multiplying a Gaussian function and the window function in the first-order filter coefficient and calculating a final filter coefficient; and
    converting a sampling rate of the intermediate image, performing filtering in horizontal and vertical directions according to the final filter coefficient, and calculating an output image of a predetermined resolution.

8. The resolution-converting method as claimed in claim 7, wherein the number of filter tabs is calculated based on an equation as below:

$$L = \text{round}(\text{Max}\{D, U\} \times \text{SmoothingAmount} \times n\text{Lobes} - 1) \times 2 - 1,$$

where L indicates a filter length, nLobes the number of side lobes, U and D ratios of optimized up-samplings to down-samplings, and SmoothingAmount a constant changing a cut-off frequency of the filter.

9. The resolution-converting method as claimed in claim 7, wherein the first-order filter coefficient is calculated based on an equation as below:

$$h[i] = \left\{\frac{\sin(x)}{x}\right\} \times \text{kaiser}(1, \beta), i = 0, 1, \ldots, L-1,$$

-continued $$x = \frac{i - \frac{L-1}{2}}{\frac{L-1}{2}} \times \pi \times \text{Lobes}$$

where $$\frac{\sin(x)}{x}$$

indicates an ideal low-frequency bandpass function, and kaiser(1,β) is a Kaiser window function.

10. A resolution-converting method, comprising:
applying an edge-directed interpolation to an input image and producing an intermediate image;
converting a sampling rate with respect to the intermediate image and producing an output image having a predetermined resolution, and
improving sharpness of the produced output image,
wherein improving the sharpness comprises:
picking up two representative colors in an overlapped block of a predetermined size;
increasing contrast between the picked-up representative colors;
transiting a pixel value existing in an edge region to an approximate representative color of the two contrast-increased representative colors; and
adding result values of the overlapped block by using a Hanning window and calculating a final pixel value in order to remove block discontinuity.

11. The resolution-converting method as claimed in claim 10, wherein the contrast of the representative colors is adaptively increased through a distance and a dot product between an input pixel and the two representative colors.

12. The resolution-converting method as claimed in claim 10, wherein the two representative colors are picked up by a K-means algorithm.

13. A resolution-converting apparatus, comprising:
an edge-directed interpolation unit for applying an edge-directed interpolation to an input image and calculating an intermediate image; and
a linear filtering unit for converting a sampling rate with respect to the intermediate image and calculating an output image having a predetermined resolution,
wherein the edge-directed interpolation comprise,
a first interpolation unit to generate interpolated pixels of a part of the input image, and
a second interpolation unit to generate interpolated pixels of other remaining part of the input image.

14. The resolution-converting apparatus as claimed in claim 13, wherein the edge-directed interpolation unit uses absolute differences of pixels of the input image to estimate an edge direction, adaptively determines an interpolation coefficient based on a pixel value of a position corresponding to the estimated edge direction, uses the edge direction and the interpolation coefficient, calculates the edge-directed interpolation value, adaptively blends an edge-directed interpolation value and an interpolation value by a predetermined linear interpolation method, and calculates a final interpolation value.

15. The resolution-converting apparatus as claimed in claim 14, wherein the edge direction is estimated with respect to two diagonal directions and four non-diagonal directions.

16. The resolution-converting apparatus as claimed in claim 14, wherein the predetermined linear interpolation method is a bi-cubic interpolation method.

17. The resolution-converting apparatus as claimed in claim 14, wherein the edge-directed interpolation unit, if the region has a high spatial frequency, uses an interpolation value by the predetermined linear interpolation method to calculate a final interpolation value.

18. The resolution-converting apparatus as claimed in claim 17, wherein it is determined whether the region has the high spatial frequency by using mean-deviated local variance in the interpolation region.

19. A resolution-converting apparatus, comprising:
an edge-directed interpolation unit for applying an edge-directed interpolation to an input image and calculating an intermediate image; and
a linear filtering unit for converting a sampling rate with respect to the intermediate image and calculating an output image having a predetermined resolution; and
a sharpness improvement unit for improving sharpness of the calculated output image, wherein the sharpness improvement unit picks up two representative colors in an overlapped block of a predetermined size, increases contrast between the picked-up representative colors, transits a pixel value existing in an edge region to an approximate representative color of the two contrast-increased representative colors, adds result values of the overlapped block by using a Hanning window, and calculates a final pixel value in order to remove block discontinuity.

20. The resolution-converting apparatus as claimed in claim 19, wherein the contrast of the representative colors is adaptively increased through a distance and a dot product between an input pixel and the two representative colors.

21. The resolution-converting apparatus as claimed in claim 19, wherein the two representative colors are picked up by the-a K-means algorithm.

22. A resolution-converting method, comprising:
determining whether an interpolation region has a high frequency; and
interpolating using an edge-directed interpolation method and a predetermined linear interpolation method if the interpolation region has not the high frequency.

23. The resolution-converting method as claimed in claim 22, comprising:
interpolating using only the predetermined linear interpolation method if the interpolation region has the high frequency.

24. The resolution-converting method as claimed in claim 23, wherein the predetermined linear interpolation method is a bi-cubic interpolation method.

* * * * *